United States Patent [19]

Chew et al.

[11] Patent Number: 4,839,756
[45] Date of Patent: Jun. 13, 1989

[54] APPARATUS FOR READ/WRITE HEAD LOADING AND UNLOADING IN A DATA RECORDING DISK FILE

[75] Inventors: David W. Chew, Richmond; Willi A. Hagenlocher, Cupertino; Chentung R. Jih, Los Gatos; Ernie G. Nassimbene, Santa Cruz, all of Calif.

[73] Assignee: International Business Machines Corporation, Armonk, N.Y.

[21] Appl. No.: 243,395

[22] Filed: Sep. 7, 1988

Related U.S. Application Data

[63] Continuation of Ser. No. 919,739, Oct. 16, 1986, abandoned.

[51] Int. Cl.⁴ .......................... G11B 5/54; G11B 5/012
[52] U.S. Cl. .................................. 360/105; 360/98.01
[58] Field of Search ..................... 360/98.01, 105, 106, 360/109, 104, 103

[56] References Cited

U.S. PATENT DOCUMENTS

| | | | |
|---|---|---|---|
| 4,167,765 | 9/1979 | Watrous | 360/103 |
| 4,253,125 | 2/1981 | Kanamuller | 360/98 X |
| 4,644,429 | 2/1987 | Boe | 360/105 |

FOREIGN PATENT DOCUMENTS

0038773 2/1985 Japan .................................. 360/105

Primary Examiner—Robert S. Tupper
Assistant Examiner—Andrew S. Sniezek
Attorney, Agent, or Firm—Thomas R. Berthold

[57] ABSTRACT

An apparatus for loading and unloading air-bearing sliders relative to their respective disk surfaces in a data recording disk file includes an elongated rod mounted on the disk file actuator arm for flexing the suspensions and attached sliders away from their respective disk surfaces. The elongated rod is located in the central longitudinal openings of the actuator arm and is movable to a first position by means of a lever when the lever is contacted by a rotatable cam supported on the disk file frame. When the cam is rotated out of engagement with the lever, a spring forces the rod out of engagement with the suspensions, thereby permitting the suspensions to act in the conventional manner to bias the sliders toward their respective disk surfaces. The sliders are thus only loaded and unloaded relative to the disk surfaces when the disks are rotating at a speed sufficient to prevent the sliders from sticking to the disk surfaces.

8 Claims, 4 Drawing Sheets

APPARATUS FOR READ/WRITE HEAD LOADING AND UNLOADING IN A DATA RECORDING DISK FILE

RELATED APPLICATIONS

This application is a continuation of application Ser. No. 06/919,739, filed on Oct. 16, 1986, in the name of D. W. Chew, W. A. Hagenlocher, C. R. Jih and E. G. Nassimbene now abandoned.

TECHNICAL FIELD

This invention relates to rotating disk files of the type in which the read/write transducer is supported on an air-bearing slider which "flies" above the disk surface when the disk is roatating at its operating speed, and in particular to an apparatus for moving the slider to and from the disk surface while the disk is rotating so as to avoid the slider containing the disk.

BACKGROUND OF THE INVENTION

In conventional rotating disk files, the read/write transducer or head is supported on a slider which rides on a cushion or bearing of air above the disk surface when the disk is rotating at its operating speed. The slider is attached to the rigid support arm of a linear or rotary actuator by means of a relatively fragile suspension. In large capacity magnetic recording disk files there is generally a stack of rigid disks and a number of actuators. Each actuator contains a number of arms, and each arm may support a number of suspensions. The actuators move the sliders radially between the disks so that each head may access the recording area of a respective disk surface.

In these conventional disk files the sliders are biased against the disk surfaces by a small force from the suspensions when the disks are not rotating. The slider are thus in contact with the disk surfaces from the time the disk file is turned on until the disks reach a rotational speed sufficient to cause the sliders to generate the air-bearing support. The sliders are again in contact with the disk surfaces when the disk file is turned off and the rotational speed of the disks fall below that necessary to create the air-bearings. In such disk files a liquid lubricant is often maintained on the disk surfaces to prevent damage to the heads and the disks during starting and stopping of the disk.

A serious problem with disk files of this type is that after the sliders have been in stationary contact with the disk surfaces for just a short period of time, the sliders tend to resist translational movement or "stick" to the disk surfaces. This "stiction" is caused by a variety of factors, including static friction and viscous shear forces, and surface tension created by the lubricant between the disks and the sliders. Even in those disks files which have disks with extremely smooth disk surfaces without a liquid lubricant, stiction may occur because of the strong intermolecular attraction at the interface between the smooth surfaces of the disks and the sliders. This stiction can result in damage to the heads, the relatively fragile suspensions or the disks when the sliders suddenly break free from the disks when disk rotation is initiated.

An additional problem in such disk files is that because the sliders are in contact with the disks when the disks are not rotating and because the suspensions are designed to flex in a generally perpendicular direction relative to the disks, the sliders and the data surfaces of the disks can be damaged if the sliders suddenly impact the disks, such as may occur during shipping of the disk file.

It is thus desirable to incorporate into these conventional disk files some type of device which, at file turn off, "unloads" the sliders away from the disks while the sliders are still supported on air-bearings, and, at file start up, "loads" the sliders toward the disks when the disks have reached a rotational speed sufficient to generate the air-bearings.

SUMMARY OF THE INVENTION

The present invention is a slider "load/unload" device and includes means located on the actuator arm and movable in a direction generally parallel to the length of the suspensions for flexing the suspensions and therewith the sliders away from the disk, and means located on the suspension for engagement with the movable flexing means on the arm. Means are also provided on the arm for moving the suspension flexing means to a first engaged position to move the sliders away from the disks, and to a second disengaged position to permit the suspensions to return the sliders to their air-bearing relationship with the disks. The load-/unload device allows the sliders to be moved toward the disk surfaces only when the disks have reached the minimum rotational speed sufficient to generate the air-bearings, and away from the disks only when the disks are rotating above this minimum speed. While in the preferred embodiment the sliders are loaded and unloaded only when the rotational speed of the disks is sufficient to generate the air bearings, the load/unload device is fully capable of loading and unloading the sliders at a lower rotational speed which is too low to generate the air bearings but high enough to prevent stiction.

In the preferred embodiment of the invention, the suspension flexing means is an elongated rod located within a central longitudinal opening on the arm. The rod has openings or bores transverse to its length of receipt of hooks attached to the suspension. The rod is moved to its first position by means of a lever having its pivot point attached to the arm and its mid-portion connected to an end of the rod. The rod is moved to its second position by means of a leaf spring attached to the arm and in contact with the end of the rod. When it is desired to unload the sliders, the actuator is moved to position the sliders to their radially outermost position on the disks while the disks are still rotating above the minimum speed needed to generate the air-bearings (or to merely avoid stiction if the sliders are to be unloaded while in contact with the disk surfaces). The lever is then rotated by a rotatable cam attached to the disk file base beyond the outer periphery of the disk. This causes the rod to engage the hooks on the suspensions and flex the suspensions away from the disks. When it is desired to load the sliders to the disks when the disks are rotating above the speed necessary to generate the air-bearings (or to merely avoid stiction if the sliders are to be loaded in contact with the disk surfaces), the rotatable cam is moved out of contact with the lever, thereby permitting the leaf spring to move the rod to its second position out of engagement with the hooks on the suspensions. This allows the suspensions to move the sliders toward the rotating disks.

The load/unload device of the present invention is operable with disk files having a plurality of suspensions per arm and multiple arms per actuator. Because the leaf spring biases the rod out of contact with the hooks on the suspensions, inadvertent unloading of the sliders by the rod is prevented during periods of rapid acceleration or deceleration of the actuator, such as may occur during rapid track seeking or movement of the actuator to the disk file crash stops.

The load/unload device of the present invention is easily assembled and requires minimal modification to existing actuator arms and suspensions. In addition, because the suspensions can be unloaded by rotation of the lever, the mating of the head/arm/actuator assembly with the disk stack during manufacturing of the disk file can be accomplished with minimal risk of damage to the disks and heads.

For a fuller understanding of the nature and advantages of the present invention, reference is made to the following detailed description taken in conjunction with the accompanying drawings.

DESCRIPTION OF THE PREFERRED EMBODIMENTS

Figure 1:
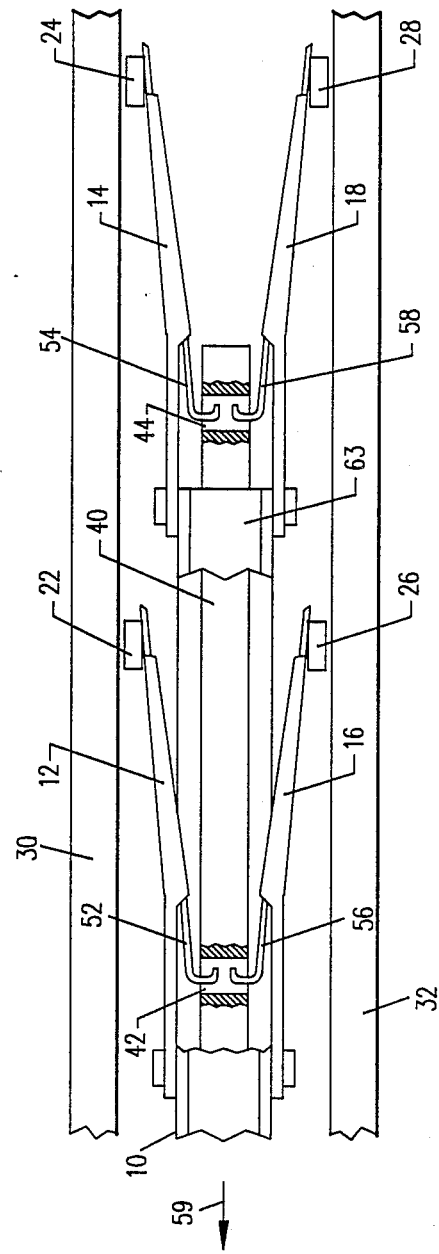
FIG. 1 is a side view of an actuator arm with two associated disks illustrating the load/unload mechanism in partial cutaway.

The basic concept of the load/unload device of the present invention is illustrated in FIG. 1, wherein there is depicted an otherwise conventional actuator arm 10 which supports suspensions 12, 14, 16 and 18. The suspensions support associated sliders 22, 24, 26 and 28, respectively, which are shown in the load or air-bearing relationship on parallel recording disks 30, 32. Each of the sliders supports a read/write head (not shown), such as a thin film head formed on the rear or trailing end of the slider. For ease of explanation only one arm 10, two disks 30, 32 and four sliders 22, 24, 26, 28 are shown in FIG. 1. However, conventional disk files have multiple disks and multiple arms attached to a single actuator, with each arm supporting mutiple sliders for two adjacent disk surfaces of two of the disks in the stack.

With one exception, the suspensions 12, 14, 16, 18 are conventional suspensions, such as the suspension described in U.S. Pat. No. 4,167,765 to Watrous, which is assigned to the same assignee as this application. Such a suspension comprises a load beam, which is mounted at one end to the actuator arm, and a flexure element which is attached to the other end of the load beam and supports the slider. The load beam provides a resilient spring action whcih biases the slider toward the surface of the disk, while the flexure element provides flexibility for the slider as the slider rides on the cushion of air adjacent the data surface of the rotating disk.

The device for unloading the sliders 22, 24, 26, 28 includes an elongated rod 40 movable generally through the center of the arm 10 for flexing the suspensions 12, 14, 16, 18 away from their respective surfaces of disks 30, 32. The rod 40 has bores 42, 44 transverse to its length, the bores being illustrated in partial cutaway view in FIG. 1. Each of the suspensions is engaged with the rod 40 by means of tabs, such as typical tab 52 on suspension 12, which are located within the bores 42, 44. The tabs 52, 54, 56, 58 may be formed of stainless steel and spot-welded to the respective stainless steel load beams of suspensions 12, 14, 16, 18.

The rod 40 is shown in FIG. 1 with the tabs 52, 54, 56, 58 located generally in the center of the bores 42, 44 and out of contact with the rod 40. In this the loaded position of the sliders the suspensions function in the conventional manner and are unconnected to any portion of the load/unload mechanism. When the rod 40 is moved in the direction shown by arrow 59, the tabs 52, 54, 56, 58 are engaged with rod 40 and the respective suspensions 20, 22, 24, 26 away from the respective surfaces of disks 30, 32, thereby unloading the heads.

Figure 2:
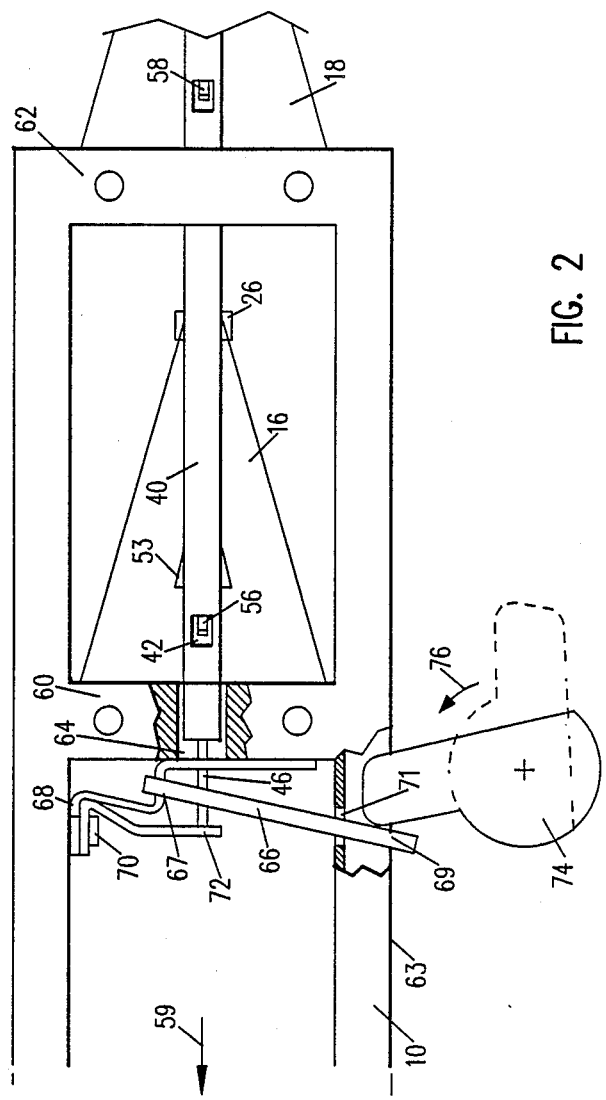
FIG. 2 is a top view of an actuator arm illustrating the load/unload mechanism and the rotatable cam for engaging the lever of the load/unload mechanism.

The means for moving the rod 40 to its first or unload position and returning it to the second or loaded position is illustrated in the top view of FIG. 2, wherein the disk 30 and suspensions 12, 14 (FIG. 1) have been removed for ease of explanation. The rod 40 moves within central openings located within the crossmembers 60, 62 of arm 10. Crossmember 60 is shown in partial cutaway to depict the opening 64 through which the rod 40 moves. Located at one end of rod 40 is a key 46 which is attached to a lever 66. The end 69 of the lever 66 passes through an opening 71 in the U-shaped side channel 63 of arm 10. Lever 66 is rotatable about its pivot point 67 which is its point of attachment to a bracket 68. Bracket 68 is secured to the arm 10 by means of bolt 70. The end of key 46 is in contact with a leaf spring 72 which is also secured to the arm 10 by bolt 70.

The rod 40 is moved in the direction of arrow 59 to its first position by means of cam 74 which rotates in the direction shown by arrow 76 and contacts the end 69 of lever 66. This is the unloaded position indicated in FIG. 2. When the cam 74 is rotated out of contact with the end 69 of lever 66, so as to be in the position indicated by the dotted lines in FIG. 2, then leaf spring 72 moves rod 40 to its second position. In the second position, rod 40 is no longer engaged by any of the tabs 52, 54, 56, 58 on the suspensions and the suspensions are free to bias their associated sliders toward their respective disk surfaces. The leaf spring 72 maintains a force on rod 40 so that rod 40 is out of contact with the suspensions and sliders remain loaded. The suspensions then function in the conventional manner without any contact with the load/unload mechanism. This is the load position indicated in FIG. 1, which illustrates the tabs 52, 54, 56, 58 in bores 42, 44 but disengaged with rod 40.

Figure 3:
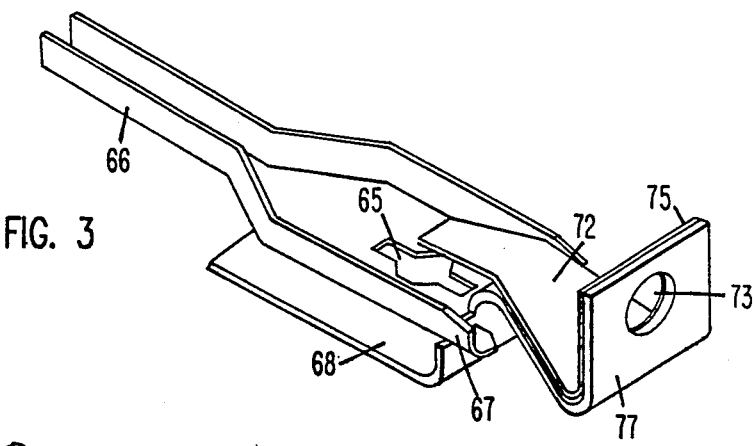
FIG. 3 is a perspective view illustrating a portion of the lever, the lever-supporting bracket and the leaf spring.

The detailed relationship between lever 66, its supporting bracket 68, and leaf spring 72 is shown in FIG. 3. The lever 66 has its pivot point 67 located on bracket 68 but is not rigidly connected to bracket 68. Both bracket 68 and leaf spring 72 have similarly formed and mated flanges 75, 77 respectively, through which there is a hole 73. Bracket 68 and leaf spring 72 are secured to arm 10 by bolt 70 (FIG. 2) which passes through hole 73.

Figure 4:
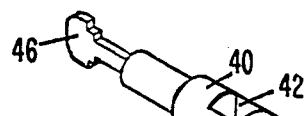
FIG. 4 is a perspective view of the elongated rod for flexing the suspensions.

FIG. 4 illustrates in detail the rod 40 with transverse bores 42, 44 and attached key 46 at its end. The manner in which lever 66 is retained within arm 10 can be understood by reference to key 46 in FIG. 4 and the notched opening 65 in lever 66, as shown in FIG. 3. With the bracket 68, leaf spring 72 mounted to arm 10, and lever 66 supported at pivot point 67 on bracket 68, the load/unload mechanism is assembled by inserting rod 40 through the openings in arm crossmembers 62, 60 with bores 42, 44 in rod 40 being oriented generally parallel with crossmembers 62, 60. In this manner key 46 passes through the slotted opening 65 in lever 66. After rod 40 has been so inserted it is rotated 90 degrees so that the bores 42, 44 are in the position shown in FIG. 2. The key 46 is now forced against lever 66 by leaf spring 72 and is prevented from passing through slotted opening 65 because it has been rotated and locked into position. Thus, lever 66 is retained within arm 10 by means of the key 46 of rod 40 and the biasing force from leaf spring 72. The suspensions 12, 14, 16, 18 (FIG. 1) are then attached to arm 10 and slightly flexed to insert tabs 52, 54, 56, 58 into the respective bores 42, 44.

Figure 5A:
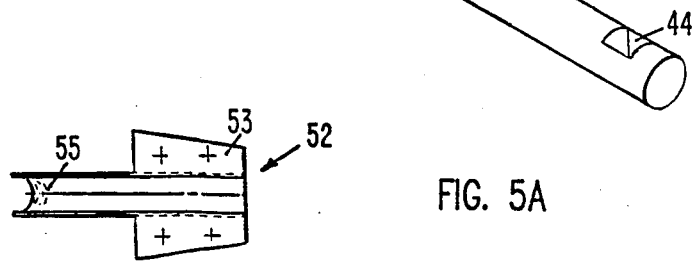
FIG. 5A is a top view of a tab for attachment to the load beam of a suspension.
Figure 5B:
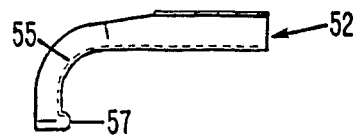
FIG. 5B is a side view of the tab shown in FIG. 5A.

An enlarged view of typical tab 52 is shown in the top and side views of FIGS. 5A and 5B, respectively. Tab 52 may be formed of a single stainless steel sheet, pressed and formed in the configuration shown in FIGS. 5A and 5B, so as to have a relatively flat plate portion 53 and depending hook 55. The flat plate portion 53 is mated with the flat load beam of the suspension 12 and spot welded to the load beam. As shown in the detailed side view of FIG. 5B, the hook 55 has a contact point 57 which serves as that point of tab 52 which engages rod 40 when rod 40 is moved to its first position to unload the sliders.

Figure 6:
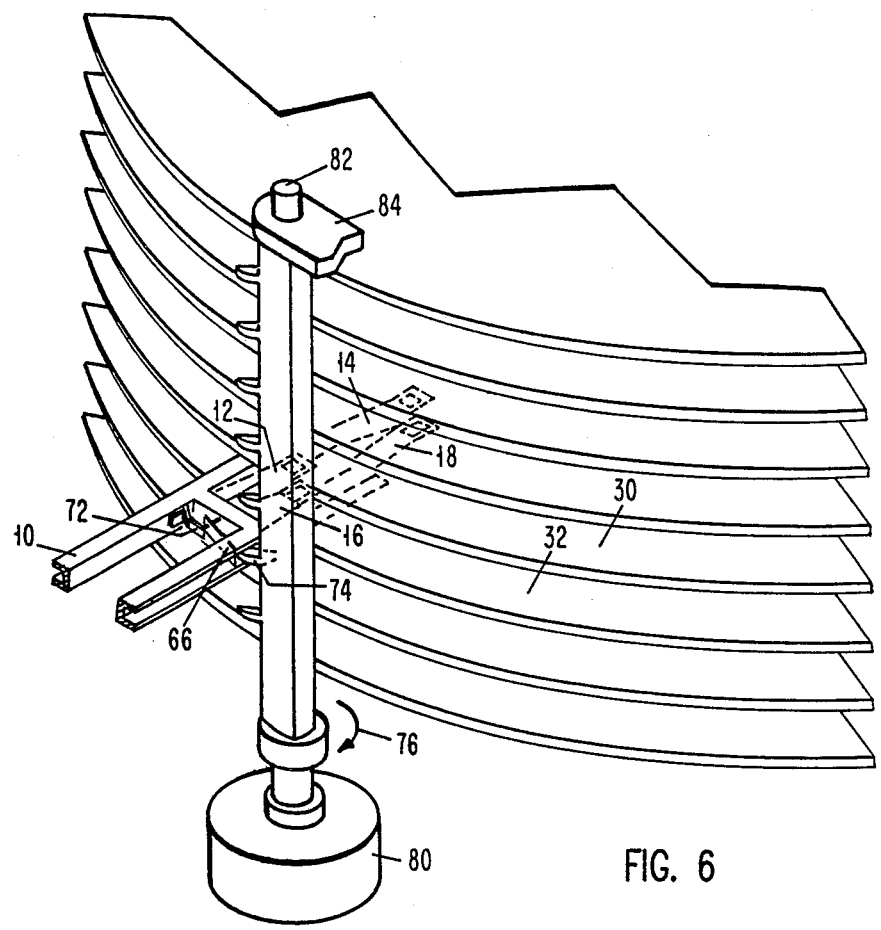
FIG. 6 is a perspective view illustrating a disk stack with a typical actuator arm and the means mounted to the disk file frame for causing rotation of the lever on the actuator arms.

The relationship of arm 10 and disks 30, 32 to the means for rotating the lever 66 is shown in FIG. 6. A conventional disk file includes a stack of disks with typical arm 10 as one of the arms attached to the actuator (not shown). The suspension 12, 14, 16, 18 on arm 10 are shown in dotted line. A stepper motor 80 is supported on the disk file frame (not shown). A shaft 82 extends from the stepper motor and has cam surfaces, such as typical cam 74, for contacting the respective levers on the actuator arms. The shaft 82 is supported for rotation by means of a support bracket 84 which is also mounted to the disk file frame.

Referring now to FIGS. 1, 2 and 6 together, the actuator (not shown) is positioned such that the arm 10 and attached sliders 12, 14, 16, 18 are at their radially outermost position on the disks 30, 32 when the disk file is turned off and the disks are not rotating. The stepper motor 80 is rotated so that shaft 82 is turned to provide cam 74 in contact with lever 66. In this manner the lever 66 is rotated and rod 40 is positioned in engagement with the tabs on the suspensions. This is the slider unloaded position in FIG. 2.

The cam 74 remains in contact with lever 66 until the disks have reached a rotational speed sufficient to generate an air-bearing for the sliders, at which time stepper motor 80 rotates shaft 82 to move cam 74 out of contact with lever 66. As cam 74 rotates out of contact with lever 66 to the position indicated by the dotted line in FIG. 2, the leaf spring 72, which is in contact with the key 46 at the end of rod 40, moves rod 40 to the second position, i.e., the position wherein rod 40 is no longer in engagement with tabs 52, 54, 56, 58. This is the slider loaded position shown in FIG. 1. As rod 40 moves out of engagement with the tabs, the suspensions are free to bias the respective sliders toward the disks and allow the air flow between the rotating disks and the sliders to support the sliders. In this manner, the sliders are loaded to the rotating disks without contacting the disk surfaces.

When it is desired to turn off the disk file, the actuator (not shown) moves arm 10 to the radially outermost position while the disks continue to rotate at a speed above that necessary to generate the air-bearings. Stepper motor 80 is then activated to rotate shaft 82 to cause cam 74 to contact lever 66. This moves rod 40 to the direction indicated by arrow 59 and causes the suspensions with attached sliders to be flexed away from the surfaces of disks 30, 32. The sliders are then unloaded with the tabs of the suspension engaged by rod 40. The rotation of the disks is then stopped without the sliders having contacted the disk surfaces. If the loading and unloading is to occur with the sliders in contact with the disk surfaces, then the operation of the load/unload device is identical to that just described with the exception that lower rotational speed which is still sufficiently high to prevent stiction.

Rod 40 (FIG. 4) may be formed entirely of stainless steel or any suitable plastic material. Alternatively, the key 46, which serves a the end of rod 40, may be of stainless steel and inserted into the cylindrical plastic portion of rod 40. Plastic bushings may also be located in the openings in arm crossmembers 60, 62, such as opening 64 (FIG. 2), to minimize the sliding friction of rod 40.

Figure 7:
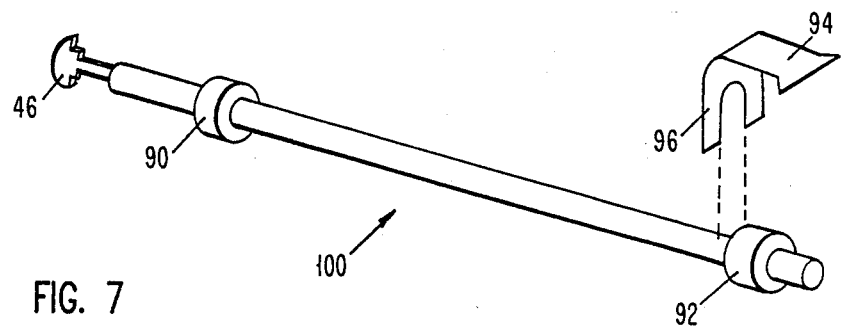
FIG. 7 is a perspective view of an alternative elongated rod with a corresponding alternative tab.

In the above-described and illustrated embodiment, the tabs on the suspensions are in engagement with rod 40 by means of the insertion of their resepctive hook portions through the bores in rod 40. As shown in the alternative embodiment of FIG. 7, it is also possible to provide lateral extensions 90, 92 on modified rod 100 and modified tabs, such as tab 94, on the suspensions. In this embodiment, rod 100 does not require any bores and the extensions 90, 92 engage slotted fingers on the tabs, such as finger 96 on tab 94, as the rod 100 is moved to the unloaded position. Similarly, as shown in FIG. 7, the extensions are moved out of control with the slotted fingers, to allow the suspensions to function in the conventional manner, when rod 100 is moved to the loaded position.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a data recording disk file having a rotatable data disk, an air-bearing slider with an attached head for reading data from or writing data to the disk, an actuator for positioning the slider and head to selected tracks on the disk, a generally rigid arm attached to the actuator, and a suspension of the type including a cantilever load beam and a flexure element, the cantilever load beam having one end attached to the arm and its free end connected to and providing the sole support for the flexure element, the flexure element being connected to and providing the sole support for the slider, and the load beam being resiliently flexible near its attachment to the arm so as to provide a loading force on the slider, an improvement to the disk file comprising:

a rigid elongated rod located on the arm and movable relative to the arm in a direction generally parallel to the load beam for flexing the load beam near its attachment to the arm;

means secured to the load beam for engaging the rod;

means mounted on the arm and connected to an end of the rod for moving the rod to a first position whereby the rod contacts the engaging means on the load beam and the slider is unloaded from the disk, and to a second position whereby the rod is moved out of contact with the engaging means and the slider is loaded to its air-bearing relationship with the disk by the loading force of the load beam;

and means attached to the disk file beyond the outer periphery of the disk for actuating the rod moving means when the slider is at its radially outermost position on the disk.

2. The improvement according to claim 1 wherein the elongated rod has a bore transverse to its length and wherein the engaging means on the load beam further comprises a hook located within the bore of the elongated rod.

3. The improvement according to claim 2 wherein the arm is generally rectangularly shaped and has an opening generally along its length and wherein the elongated rod is located within the opening.

4. The improvement according to claim 1 wherein the means for moving the rod further comprises a lever attached to the arm and connected to an end of the rod for moving the rod to the first position, and a spring attached to the arm and contacting said rod for moving the rod to the second position.

5. In a magnetic recording disk file having a rotatable data disk, an air-bearing slider with an attached head for reading data from or writing data to the disk, an actuator for moving the slider and therewith the head to selected tracks on the disk, a rigid generally rectangularly shaped arm attached to the actuator, and a suspension including a cantilever load beam and a flexure element, the cantilever load beam having one end attached to the arm and its free end connected to and providing the sole support for the flexure element, the flexure element being connected to and providing the sole support for the slider, and the load beam being resiliently flexible near its attachment to the arm so as to provide a loading force on the slider, an improvement to the disk file comprising:

an elongated rod located on the arm and movable in a direction generally parallel to the load beam and the length of the arm;

means attached to the load beam and extending therefrom in a direction generally perpendicular to the rod for engaging the rod;

a lever having its pivot point attached to the arm, its movable end located adjacent a side of the arm, and a portion between the pivot piont and the movable end connected to an end of the rod;

means for rotating the lever so as to move the connected rod in a direction towards the actuator, whereby the rod contacts the engaging means and flexes the load beam to unload the slider from the disk; and means attached to the arm for biasing the rod out of contact with the engaging means when the lever rotating means is moved away from the lever, whereby the force provided by the resiliently flexible load beam loads the slider to its air-bearing relationship with the disk.

6. The improvement according to claim 5 wherein the rod biasing means further comprises a leaf spring in contact with the rod and attached to the arm near the attachment of the pivot point of the lever.

7. A head/arm assembly for attachment to an actuator in a magnetic recording disk file having a plurality of disks and a plurality of air-bearing sliders each slider supporting a head, the assembly comprising:

a rigid generlly rectangular shaped arm having one end adapted for attachment to an actuator and a central opening along its length;

an elongated rod movable through the central opening;

a lever attached to the arm and connected to a first end of the rod for moving the rod to a first position;

a spring attached to the arm and in contact with the first end of the rod for moving the rod to a second position;

a suspension including a cantilever load beam and a flexure element, the load beam having one end attached to the other end of the arm opposite said one end adapted for attachment to the actuator and its free end providing the sole support for the flexure element, the flexure element being adatped for connection to and for providing the sole support for an air-bearing slider with attached head, the load beam being resiliently flexible near its attachment to the arm so as to provide a loading force on the slider; and means attached to and extending generally perpendicular to the load beam for engagement with the rod, whereby when the lever moves the rod to the first position the load beam flexes near its attachment to the arm and the attached slider is moved away from its associated disk surface, and when the spring moves the rod to the second position the rod is moved out of contact with the engagement means and the load beam resiliently flexes to load the slider to its air-bearing relationship on its associated disk surface.

8. The head/arm assembly according to claim 7 further comprising a second like load beam providing support for a second slider and attached to the arm between the end of the arm adapted for actuator attachment and said first load beam, and a second like rod engagement means attached to the second load beam, and wherein said rod includes means for receiving the rod engagement means on said second load beam, whereby when the rod is moved to the first position, the second load beam is flexed moving said second slider away from its associated disk surface.

* * * * *

UNITED STATES PATENT AND TRADEMARK OFFICE
CERTIFICATE OF CORRECTION

PATENT NO. : 4,839,756
DATED : June 13, 1989
INVENTOR(S) : D. W. Chew et al.

It is certified that error appears in the above-identified patent and that said Letters Patent is hereby corrected as shown below:

Column 1, line 19, "containing" should be --contacting--.

Column 3, line 49, "load" should be --loaded--.

Column 3, line 67, "whcih" should be --which--.

Column 4, line 17, "contact with the rod" should be --contact with rod--.

Column 4, line 23, following the word "suspensions" insert --12, 14, 16, 18 are flexed so as to move the respective sliders--.

Column 4, line 25, "unload" should be --unloaded--.

Column 4, line 57, "load" should be --loaded--.

Signed and Sealed this

Third Day of April, 1990

Attest:

HARRY F. MANBECK, JR.

*Attesting Officer*  *Commissioner of Patents and Trademarks*